United States Patent
Van Reenen

(10) Patent No.: US 6,711,510 B2
(45) Date of Patent: Mar. 23, 2004

(54) OVER-CURRENT PROTECTION METHOD AND DEVICE

(75) Inventor: David G. Van Reenen, Livonia, MI (US)

(73) Assignee: TRW Inc., Lyndhurst, OH (US)

( * ) Notice: Subject to any disclaimer, the term of this patent is extended or adjusted under 35 U.S.C. 154(b) by 154 days.

(21) Appl. No.: 09/789,789

(22) Filed: Feb. 20, 2001

(65) Prior Publication Data

US 2002/0128785 A1 Sep. 12, 2002

(51) Int. Cl.[7] .................................................. H02P 7/00
(52) U.S. Cl. .............................. 702/65; 702/64; 318/434
(58) Field of Search ............................... 702/65, 57, 64, 702/126, 124, 115, 182, 183, 189, FOR 103, FOR 104, FOR 106, FOR 134, FOR 135, FOR 170, FOR 171; 701/41–44; 180/443, 446, 404, 421, 422; 318/254, 599, 565, 432, 434, 490; 700/292, 293; 324/522, 536, 177; 361/23, 24, 30, 31, 87; 388/806, 815, 811, 823, 907.5, 909, 923

(56) References Cited

U.S. PATENT DOCUMENTS

| | | | |
|---|---|---|---|
| 4,660,671 A | 4/1987 | Behr et al. .................... 180/446 |
| 4,666,014 A | 5/1987 | Carlson et al. ............... 180/446 |
| 5,299,648 A | 4/1994 | Watanabe et al. ............ 180/446 |
| 5,303,156 A | 4/1994 | Matsuoka et al. ............ 701/43 |
| 5,475,289 A | 12/1995 | McLaughlin et al. ........ 318/432 |
| 5,475,556 A | 12/1995 | Yoon et al. .................... 361/87 |
| 5,480,000 A | 1/1996 | Daido et al. .................. 180/446 |
| 5,517,415 A | 5/1996 | Miller et al. .................. 701/43 |
| 5,726,577 A | 3/1998 | Engel et al. ................... 324/536 |
| 5,761,627 A | 6/1998 | Seidel et al. .................. 701/41 |
| 5,787,376 A | 7/1998 | Nishino et al. ............... 701/41 |
| 5,913,913 A | 6/1999 | Okanoue et al. .............. 701/41 |
| 5,925,995 A * | 7/1999 | Yoshida et al. ............... 318/434 |
| 6,008,599 A | 12/1999 | Beck ............................. 318/254 |
| 6,029,767 A * | 2/2000 | Kifuku .......................... 180/443 |
| 6,054,822 A * | 4/2000 | Harada ......................... 318/434 |
| 6,216,814 B1 * | 4/2001 | Fujita et al. .................. 180/422 |
| 6,266,591 B1 * | 7/2001 | Wilson-Jones et al. ....... 701/41 |
| 6,384,563 B1 * | 5/2002 | Someya ........................ 318/700 |

* cited by examiner

*Primary Examiner*—Hal Wachsman
(74) *Attorney, Agent, or Firm*—Tarolli, Sundheim, Covell & Tummino L.L.P.

(57) ABSTRACT

A method and device to protect a drive circuit of a power assist motor from an over-current condition. A sensor takes instantaneous measurements of the current provided to the motor. A charge accumulation determining function determines charge accumulation from the instantaneous current samples. When the current provided to the motor exceeds a threshold value and the determined charge accumulation exceeds a threshold charge accumulation, the current provided to the motor is decreased. When the current provided to the motor is less than the threshold current value for more than a predetermined period, the determined charge accumulation is reduced by a predetermined factor. After the charge accumulation has been reduced below a predetermined threshold, the current provided to the motor is increased.

18 Claims, 5 Drawing Sheets

OVER-CURRENT PROTECTION METHOD AND DEVICE

TECHNICAL FIELD

The present invention relates to a current control method and associated device for an electric motor, and more particularly to a method and device for protecting a drive circuit of an electric power assist steering motor from over-current conditions.

BACKGROUND OF THE INVENTION

Power assist steering systems are generally well known. Power assist steering systems assist a vehicle driver in steering a vehicle. More particularly, power assist steering systems assist a driver in steering the steerable wheels of a vehicle when the driver applies torque to the steering wheel of the vehicle.

Power assist steering systems are of many different types. Some known power assist steering systems provide assist force via the use of hydraulic power. Other power assist steering systems provide assist force via the use of electric power. An electric power assist steering system includes an electric motor that is drivably interconnected to steering components of the steerable wheels of the vehicle.

As with the operation of most electric motors, an electric motor used in an electric power assist steering system is energized or activated by current provided through stator windings of the electric motor. The current provided through the stator windings causes a rotor of the motor to rotate. The direction of the current through the stator windings controls the rotation direction of the rotor. Generally speaking, the magnitude of the current controls the torque provided by the motor.

Variable reluctance motors are commonly used in electric power assist steering systems because of their small size, low friction, and high torque to inertia ratio. In variable reluctance motors, typically separate stator windings are energized in pairs. More particularly, electric current is provided to the stator coils associated with a pair of stator poles. The rotor moves to minimize the reluctance between the energized stator poles and the rotor poles. Once a minimum reluctance is reached and the rotor poles thereby align with the energized stator poles, the energized stator poles are de-energized and an adjacent pair of stator poles are energized. The rotor then moves to minimize the reluctance between the newly energized stator poles and the rotor poles. The rotor is thereby caused to rotate based upon the sequence within which the stator poles are energized and de-energized.

A drive circuit is typically used to control the current that is provided to the motor to energize the stator windings. The drive circuit essentially regulates the energy delivered to the motor from a power source, such as a vehicle battery. Many types of drive circuits can be used to control the electric current provided to the motor. Needless to say, regardless of the type of drive circuit used, different electronic components are incorporated within the drive circuit to enable the circuit to accomplish its intended purpose. It is, generally well known that electronic components have operating tolerances, such as maximum temperature and current thresholds. Operating the components above these tolerances can affect the performance of the components and thereby potentially affect the operation of the drive circuit.

Some effort has been made to control the operation of motors so that operating conditions are maintained within tolerances. For instance, because it is generally well known that drive circuits and the components contained therein heat-up as current is provided to the motor, efforts have been made to control the amount of current provided to the motor. Heat sinks are often integrated into the drive circuits to control the temperature of the circuits. Also, a thermistor is commonly included in the system to provide thermal feedback of the temperature of the circuit. The feedback is used to reduce the power delivered to the motor when heat generated in the circuit causes temperatures to reach threshold levels.

However, most thermistors have a response time delay associated with their use. As a result, the temperature may exceed a threshold level by the time the threshold temperature is detected by the thermistor. Alternatively, because heat may continue to propagate throughout the circuit for a period of time after current is no longer provided to the motor, the temperature may continue to increase after a threshold temperature is sensed by the thermistor and the current is subsequently reduced. Moreover, once a threshold temperature is sensed by the thermistor and the current has been reduced, the latent heat of the circuit may not allow it to cool down in a sufficiently short amount of time. Essentially, because it takes some period of time for heat to dissipate, the components may be affected by the latent heat of the circuit.

U.S. Pat. No. 4,660,671 discloses an electronic control system for an electric motor coupled to a steering system. The patent discloses a drive circuit that includes four field-effect transistors connected in an H pattern, to effect switching within the motor. These as well as other components of the circuit control the energization of the electric motor. A fold-back circuit monitors the magnitude of current drawn by the motor and the temperature of the driving circuit. The fold-back circuit limits the current provided to the motor to prevent excess current from being applied to the motor. As the temperature of a heat sink increases, the maximum current permitted through the motor decreases.

Similarly, U.S. Pat. No. 5,475,289 discloses a method and apparatus for controlling an electric assist steering system. A motor current sensor is operatively connected to the electric motor for sensing the amount of current through the motor. The output of the current sensor is connected to a current fold-back circuit. If the sensed current through the motor is too high, i.e., greater than a predetermined value, the value of the torque demand signal is decreased to prevent switches from burning out.

SUMMARY OF THE INVENTION

According to one aspect, the present invention provides a method for protecting a drive circuit of an electric power assist steering motor. A charge accumulation from current provided to the motor is determined. The current provided to the motor is controlled based upon the determined charge accumulation.

According to another aspect, the present invention provides an over-current protection device for protecting a drive circuit of an electric power assist steering motor. Means determines a charge accumulation from current provided to the motor. Means controls the current provided to the motor based upon the determined charge accumulation.

According to another aspect, the present invention provides an over-current protection device for protecting a drive circuit of an electric power assist steering motor. The device includes a current sensor and a controller. The current sensor senses current provided to the motor. The controller determines whether the sensed current is less than a threshold current value. The controller determines a charge accumulation by subtracting the sensed current from a threshold current value and adding the difference to a previous charge accumulation. The controller decreases a fold-back factor when the sensed current is greater than the threshold current value and the determined charge accumulation is greater than a threshold charge accumulation. The controller decreases the current provided to the motor by applying the fold-back factor to the current provided to the motor. The controller determines whether the sensed current is less than the threshold current value for a predetermined period of time. The controller determines whether the determined charge accumulation is less than or equal to a second threshold charge accumulation. The controller increases the fold-back factor when the sensed current is less than the threshold current value for the predetermined period of time and the determined charge accumulation is less than or equal to the second threshold charge accumulation. The controller increases the current provided to the motor by applying the fold-back factor to the current provided to the motor.

BRIEF DESCRIPTION OF THE DRAWINGS

The foregoing and other features and advantages of the present invention will become more apparent to one skilled in the art upon consideration of the following description of the invention and the accompanying drawings, wherein.

DESCRIPTION OF AN EXAMPLE EMBODIMENT

Figure 1:
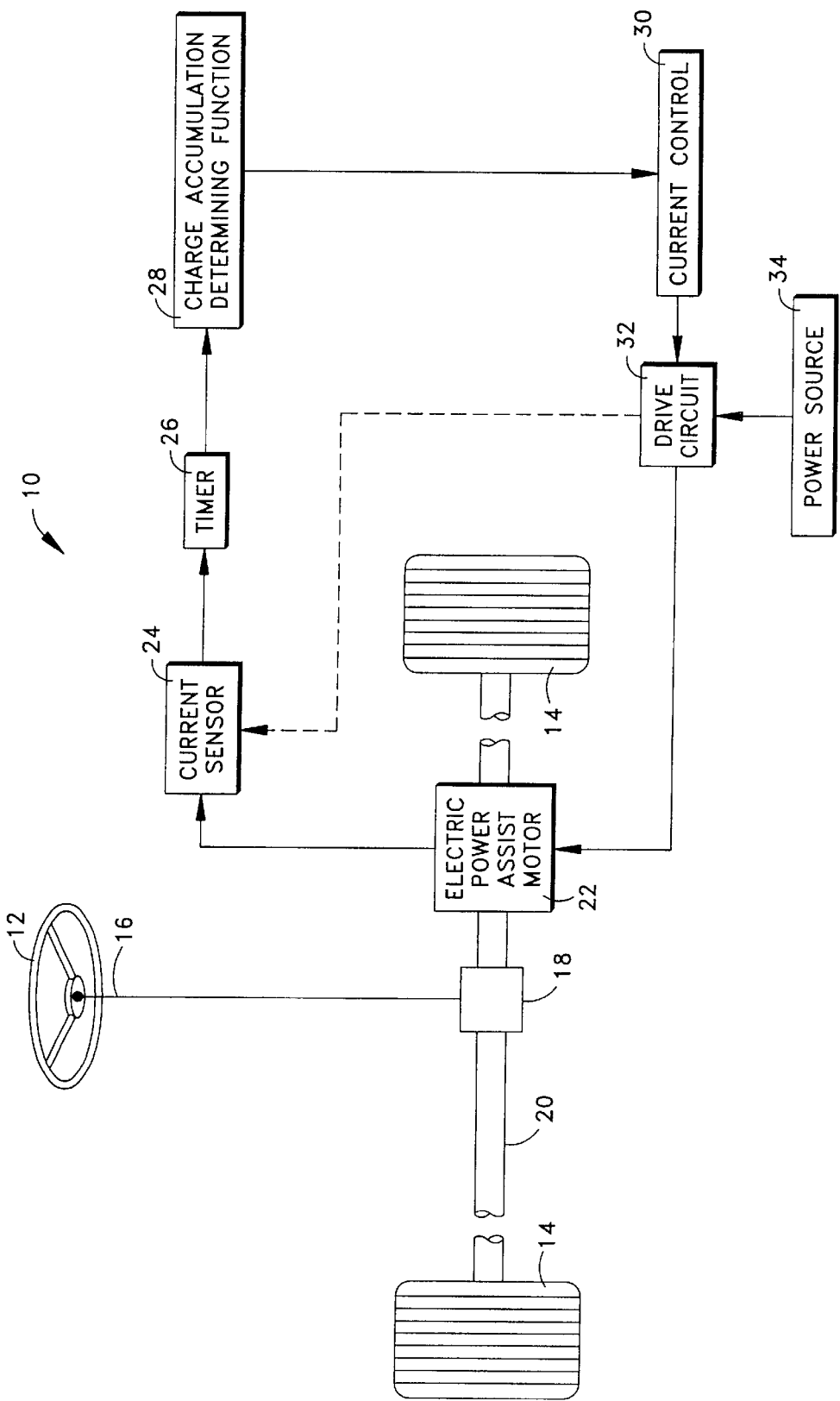
FIG. 1 is a schematic block diagram of an electric assist steering system in accordance with the present invention.

With reference to FIG. 1, a power assist steering system 10 in accordance with the present invention is shown. In the system 10, a steering wheel 12 is drivingly connected to steerable wheels 14. The driving connection is, in part, effected by an input shaft 16. One end of the input shaft 16 is connected to the steering wheel 12. The steering wheel 12 is rigidly connected to this end of the input shaft 16 so that the shaft turns when the wheel 12 is turned. The other end of the input shaft 16 is connected to a gearbox 18. The gearbox 18 contains one or more gears (not shown), such as a pinion gear. The gear(s) in the box 18 engage a linear steering member 20, such as a rack. Often, the gear(s) in the box 18 have helical teeth (not shown) that meshingly engage straight cut teeth (also not shown) on the member 20 in a known fashion.

The steering member 20 is steerably coupled to the steerable wheels 14 by steering linkage (not shown) in a known manner. When the steering wheel 12 is turned by the driver, the member 20 and the gear(s) in the box 18 transfer the torque applied to the steering wheel 12 by the driver to the steerable wheels 14. This is done by converting the torque exerted on the steering wheel 12 into a linear motion in the member 20. The linear motion of the steering member 20 causes the steerable wheels 14 to pivot about their associated steering axis (not shown) thus steering the steerable wheels 14.

In an electric power assist steering system an electric power assist motor 22 is operatively connected to the steering member 20 such that when the motor 22 is energized, it assists the driver in steering the steerable wheels 14. More particularly, when the driver turns the steering wheel 12, current is provided to the motor 22 so that the motor assists the driver in steering the steerable wheels 14. The further the driver turns the steering wheel 12, the further the steerable wheels 14 need to be turned. Accordingly, more current is provided to the motor 22 when the steering wheel 12 is turned further.

In one example, the motor 22 is a variable reluctance motor. Further in the one example, the motor 22 is connected to the member 20 through a ball-nut driving arrangement (not shown) in a known manner. A current sensor 24 provides an indication of current supplied to the motor 22. The current sensor 24 is operatively connected to a timer 26. In turn, the timer 26 is operatively connected to a charge accumulation determining function 28. A current control 30 is located in between the determining function 28 and a drive circuit 32 for the electric motor 22. A power source (e.g., a battery) 34 is operatively connected to the drive circuit 32 in a known manner so as to supply electrical energy.

The current sensor 24 may be of any type known in the art. For instance, it is known that motor current sensors can directly or indirectly sense the current provided to a motor. Accordingly, the motor current sensor 24 may directly sense the current running through motor stator windings. Alternatively, as illustrated in phantom in FIG. 1, the motor current sensor 24 may indirectly sense the current provided to the electric motor 22 through an operative connection to the drive circuit 32. For example, to sense the motor current from the drive circuit 32, the sensor 24 may comprise a differential amplifier (not shown) which provides a signal indicative of a voltage drop across a current sense resistor (also not shown). Such a configuration is well known and therefore is not discussed in further detail. The output of the amplifier is indicative of the current provided to the motor stator windings. As mentioned above, the current sensor 24 disclosed herein may be of any type, including those that directly or indirectly sense the current provided to the motor 22.

The timer 26 is operative to start timing for a predetermined period of time provided that the current sensed by the current sensor 24 is below a threshold current value and remains below the threshold current value. The charge accumulation determining function 28 determines a charge accumulation, in part, from the current provided to the motor 22. When the timer 26 times out, indicating that the current provided to the motor has been less than the threshold current value for the predetermined period of time, the determined charge accumulation is reduced by a factor amount. After the determined charge accumulation has been reduced to a certain value, the amount of current provided to the motor is increased. Conversely, when the current provided to the motor 22 is greater than the threshold current value and the determined charge accumulation is greater than a threshold charge accumulation, the amount of current provided to the motor is decreased.

The current control 30 uses the information from the current sensor 24, timer function 26, and the charge accumulation determining function 28 to control the current provided to the electric power assist motor 22 via the drive circuit 32. Most often, the current control 30 utilizes "fold-back" circuitry to appropriately increase or decrease the current. Fold-back circuitry is known and the details are therefore not discussed herein. Suffice it to say that the fold-back is a factor that is applied to the current provided to the motor 22. Usually the current provided to the motor 22 is multiplied by the fold-back factor. Accordingly, when the fold-back factor is less than one, the amount of current provided to the motor 22 is reduced. Typically, a system is configured such that a fold-back factor of one allows maximum current to be provided to the motor 22. In such a configuration, for example, a fold-back factor of 0.5 would allow only one-half of the maximum current to be provided to the motor 22.

As mentioned above, the amount of current provided to the motor can affect the components (not shown) of the drive circuit 32 for the motor 22. The heat generated in the drive circuit is one factor that can affect the operation of the components. The heat generated in the circuit 32 is functionally related to the current provided to the motor 22.

The present invention, therefore, limits the current provided to the motor to protect the components from associated temperature increases that may not be remedied in a timely fashion by heat sink and/or thermistor technology.

As part of the present invention, a charge accumulation is determined. In accordance with the present invention, the charge accumulation is one factor that is considered in controlling the amount of current provided to the motor 22.

The charge accumulation, in part, is a function of the current provided to the motor 22 and a predetermined threshold current value. For example, if the threshold current limit is 80 amps, the charge accumulation will be determined, in part, from the sensed current provided to the motor 22 and the threshold current limit of 80 amps. More particularly, the charge accumulation is determined according to the formula:

$$CA_n = CA_{n-1} + I_n - I_{max}$$

where $I_{max}$ is the threshold current value, or 80 amps in the example discussed herein. $I_n$ is the value of the $N^{th}$ instantaneous measurement of the current provided to the motor 22, $CA_n$ is the charge accumulation corresponding to the $N^{th}$ instantaneous measurement of the current provided to the motor. $CA_{n-1}$ is the previous charge accumulation corresponding to the $N^{th}-1$ instantaneous measurement of the current provided to the motor 22.

Note that charge accumulation is a determination of accumulated electrical charge rather than current. This is true even though current symbols are stated in the above equation. To determine the charge accumulation, an instantaneous measurement of the current provided to the motor is taken by the current sensor 24. As is well known, current, measured in amperes, is a measurement of the amount of electrical charge flowing past a given point in space over a given period of time. Electrical charge is measured in Coulombs. Accordingly, current can be thought of as the number of Coulombs flowing flows past a given point in space over a given period of time.

In the present invention, when the current sensor 24 takes an instantaneous measurement of the current provided to the motor 22, the period of time is reduced to zero. As such, the instantaneous measurement is a measurement of current defined as the number of Coulombs per second at a particular instant in time. In accordance with the present invention, many of these instantaneous current measurements are accumulated over time as a determination of the charge accumulation (Coulombs per second times a period of time equals Coulombs). The current provided to the motor is increased, decreased or left the same based, in part, upon the determined charge accumulation. For instance, the current provided to the motor 22 is reduced when the current is greater than a threshold current value, i.e. 80 amps, and the charge accumulation is greater than a threshold charge accumulation.

The threshold charge accumulation is determined by a value slightly above the threshold current value. For instance, where the threshold current is 80 amps, the threshold charge accumulation may be based upon the equivalent of 100 amps DC for one second. The threshold charge accumulation may be empirically determined, for example, in a lab by measuring what a particular component of interest can literally tolerate. For instance, if it is determined that the component can withstand 100 amps for one second, then the threshold charge accumulation will be the equivalent of 100 amps DC for one second.

Because the equation defines the charge accumulation in terms of the difference between the instantaneous measured value and the threshold current, the threshold charge accumulation can be in thought of in terms of how much the current provided to the motor can exceed the threshold current value. Accordingly, where the threshold current value is 80 amps and the threshold charge accumulation is 100 amps DC for one second, the threshold charge accumulation can be thought of as permitting the current provided to the motor 22 to exceed the threshold current value by the equivalent of 20 amps DC for one second. Thus, where 100 amps are provided to the motor 22, the present invention will reduce the current provided to the motor in one second.

Similarly, because the foregoing charge accumulation equation accumulates or sums the difference between the sensed current and the threshold current with the previous charge accumulation, a current of 90 amps will cause the current provided to the motor 22 to be reduced in two seconds. Likewise, a current of 85 amps will cause the current provided to the motor to be reduced in four seconds. A current of 81 amps will cause the current provided to the motor 22 to be reduced in 20 seconds.

The charge accumulation can also be thought of in terms of the instantaneous current measured times the number of measurements taken over a period of time. For instance, where the threshold current value is 80 amps and the threshold charge accumulation is the equivalent of 100 amps for one second (yielding a charge difference of 20 Coulombs) and 23,500 samples are taken in one second, then the threshold charge accumulation is 470,000 Coulomb-samples per second (20 Coulombs/sec.×1 sec.× 23,500 samples/sec.=470,000 Coulomb-samples/sec.).

In accordance with the present invention, the current provided to the motor will be reduced when the equivalent of 470,000 Coulomb-samples in one second are accumulated at a sample rate of 23,500 samples per second. A current of 90 amps (yielding a charge difference of 10 Coulombs) would therefore cause the current provided to the motor 22 to be reduced in two seconds (10 Coulombs/sec.×2 sec.×23,500 samples/sec.=470,000 Coulomb-samples/sec.). A current of 85 amps (yielding a charge difference of 5 Coulombs) would sense the current provided to the motor 22 to be reduced in 4 seconds (5 Coulombs/sec.×4 sec.×23,500 samples/sec.=470,000 Coulomb-samples/sec.). A current of 81 amps (yielding a charge difference of 1 Coulomb) would cause the current provided to the motor 22 to be reduced in 20 seconds (1 Coulomb/sec.×20 sec.×23,500 samples/sec.= 470,000 Coulomb-samples/sec.).

It is to be appreciated that while the present invention reduces the current provided to the motor 22 when the current is greater than the threshold current value and the determined charge accumulation is greater than the threshold charge accumulation, the present invention also increases the current provided to the motor after the current drops below the threshold current value for a predetermined period of time, such as for one second, and the charge accumulation is reduced below a second predetermined threshold value, such as zero. The threshold values are chosen to maintain the operation of the circuit within acceptable tolerances.

Figure 2:
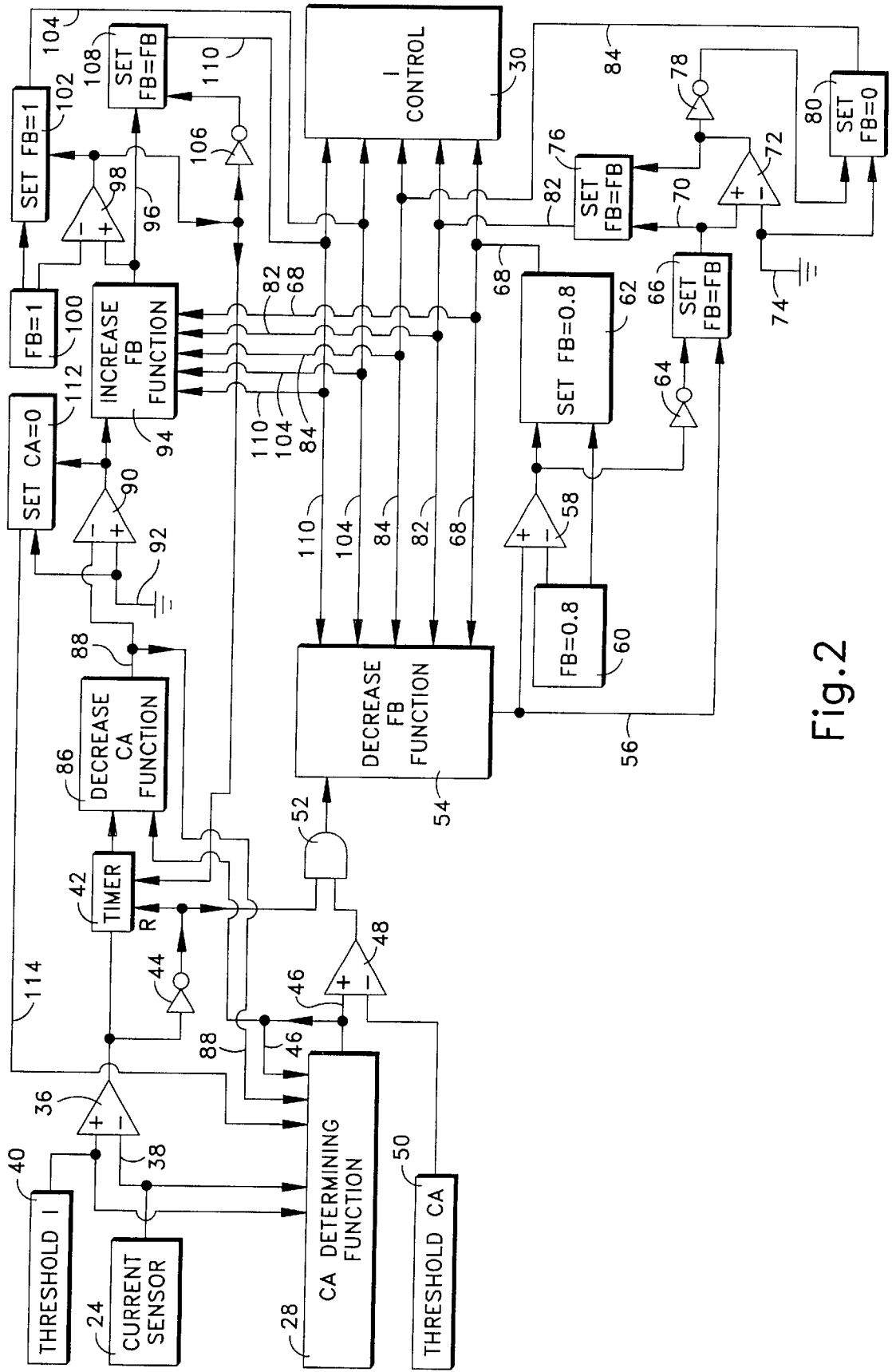
FIG. 2 is a logic diagram in accordance with the present invention.

With respect to FIG. 2, an exemplary logic diagram in accordance with the present invention is illustrated. Note that the logic diagram is exemplary only and is not intended to limit the scope of the present disclosure. For instance, the present invention could be implemented with discrete and/or integrated circuitry. Alternatively, the present invention could be comprised as software only and implemented in an existing current sense feedback system.

In the logic diagram, the current sensor 24 is connected to one input of comparator 36. The current sensor 24 outputs a signal 38 indicative of the current provided to the motor 22. The signal 38 is thereby received at one input of comparator 36. The threshold current value 40 is fed into the other input comparator 36. AS long as the threshold current value 40 is greater than the sensed current 38, comparator 36 outputs a digital HIGH. Otherwise, comparator 36 outputs a digital LOW.

The output of comparator 36 is fed into timer 42. When timer 42 receives a digital HIGH, it starts timing. Timer 42 continues to time as long as it receives a digital HIGH. Timer 42 outputs a digital LOW while it is timing. After timing for a predetermined period of time, such as one second, timer 42 times out. When timer 42 times out, it outputs a digital HIGH.

The output of comparator 36 is also fed into inverter 44. Inverter 44 inverts the signal fed into it. Accordingly, inverter 44 outputs a digital HIGH when it receives a digital LOW from comparator 36. Likewise, inverter 44 outputs a digital LOW when it receives a digital HIGH from comparator 36. The output of inverter 44 is fed into a reset input "R" of timer 42. When a digital HIGH is fed into the reset input R of timer 42, timer 42 is reset. When timer 42 is reset, it outputs a digital LOW and starts the timing process anew. The timer 42 must, therefore, once again time for the entire predetermined period of time before timing out and outputting a digital HIGH. Because inverter 44 inverts the signal output from comparator 36, timer 42 is reset whenever the sensed current 38 provided to the motor 22 goes above the threshold current value 40.

The sensed current 38 provided to the motor 22 is also fed from the current sensor 24 to the charge accumulation determining function 28. The output 46 of charge accumulation determining function 28 is fed into one input of comparator 48. The output 46 of charge accumulation determining function 28 is a signal indicative of the determined charge accumulation during the $N^{th}$ current sample. The determined charge accumulation signal 46 is fed back into the charge accumulation determining function 28. When the $N^{th}$ determined charge accumulation is fed back into function 28, it is fed back as the $N^{th}-1$ determined charge accumulation so that, in accordance with the formula discussed above, it can be used in the determination of the next $N^{th}$ charge accumulation, i.e. summed with the difference between the threshold current value and the next $N^{th}$ current sample.

The threshold charge accumulation 50 is fed into the other input of comparator 48. Comparator 48 outputs a digital HIGH when the determined charge accumulation 46 is greater than the threshold charge accumulation 50. Otherwise, comparator 48 outputs a digital LOW. The output of comparator 48 is fed into one input of AND gate 52. The output of inverter 44 is fed into the other input of AND gate 52. When both inputs of AND gate 52 receive a digital HIGH, the AND gate 52 outputs a digital HIGH. Otherwise, AND gate 52 outputs a digital LOW. Accordingly, AND gate 52 outputs a digital HIGH when the determined charge accumulation 46 is greater than threshold charge accumulation 50 and the sensed current 38 is greater than the threshold current value 40.

The output of AND gate 52 is fed into a decrease fold-back function 54. When the decrease fold-back function 54 receives a digital HIGH from AND gate 52, the decrease fold-back function 54 decreases the fold-back factor, for example by a value of 0.001. When the process begins, the fold-back function 54 is initially set to a predetermined value, such as one. The fold-back is thereafter adjusted appropriately. When the decrease fold-back function 54 receives a digital HIGH from AND gate 52, the decrease fold-back function 54 outputs a signal 56 indicative of the value of the fold-back. The signal 56 is fed into one input of comparator 58. A predetermined fold-back value 60 is fed into the other input of comparator 58. In the example illustrated, the predetermined fold-back value 60 is 0.8. However, it is to be appreciated that as with all values illustrated herein, the value 60 may be set to any desired value.

Comparator 58 outputs a digital HIGH if the fold-back value 56 is greater than the preset fold-back value 60. Otherwise, comparator 58 outputs a digital LOW. The output of comparator 58 is fed into a fold-back set function 62. When a digital HIGH is received by the fold-back set function 62, the fold-back is set to a predetermined value. In the example illustrated, the fold-back is set to a value of 0.8 in function 62. However, again, as with all values illustrated herein, the fold-back may be set to any other desired value in function 62.

The output of comparator 58 is also fed into inverter 64. The inverter 64 inverts the signal fed into it. Accordingly, inverter 64 outputs a digital HIGH when it receives a digital LOW from comparator 58. Inverter 64 outputs a digital LOW when it receives a digital HIGH from comparator 58. The output of inverter 64 is fed into fold-back set function 66.

When fold-back set function 66 receives a digital HIGH from inverter 64, the fold-back set function sets the fold-back to the value 56 determined in decrease fold-back function 54. Accordingly, when the fold-back value 56 is greater than the predetermined fold-back value 60, the fold-back value is set to the predetermined value, 0.8 in the example illustrated. Alternatively, when the fold-back value 56 is less than the predetermined fold-back value 60, the fold-back is set to the decreased fold-back value 56. When the fold-back value 56 is greater than the predetermined fold-back value 60, fold-back set function 62 receives a digital HIGH and outputs a signal 68 indicative of the fold-back value as set by function 62. When the fold-back value 56 is less than the predetermined fold back value 60, fold-back set function 66 receives a digital HIGH and outputs a signal 70 indicative of the value of the fold-back as determined by fold-back set function 66.

The output 70 of function 66 is fed into one input of comparator 72. The other input of comparator 72 is connected to another threshold fold-back value 74. In the example illustrated, this value 74 is zero as it is connected to ground. Comparator 72 outputs a digital HIGH when the fold-back value 70 is greater than the threshold value 74. Otherwise, comparator 72 outputs a digital LOW.

The output of comparator 72 is fed into fold-back set function 76. When fold-back set function 76 receives a digital HIGH, the fold-back set function sets the fold-back to the value 56 as determined in the decrease fold-back function 54. Recall that the value 56 of the fold-back was carried through in the set fold-back function 66. Accordingly, the output 70 of set fold-back function 66 is also fed into the set fold-back function 76 so that fold-back set function 76 may set the fold-back to the value 56 as determined in the decrease fold-back function 54.

The output of comparator 72 is also fed into inverter 78. Inverter 78 inverts the signal that it receives. Accordingly, inverter 78 outputs a digital HIGH when it receives a digital LOW from comparator 72. Likewise, inverter 78 outputs a digital LOW when it receives a digital HIGH from comparator 72.

The output of inverter 78 is fed into said fold-back function 80. When set fold-back function 80 receives a digital HIGH from inverter 78, set fold-back function sets the fold-back to the threshold value 74. Accordingly, the fold-back is set to the value 56 as determined in decrease fold-back function 54 when the fold-back 70 is greater than the threshold 74. Otherwise, the fold-back value is set to the predetermined threshold value 74, zero in the example illustrated. When the fold-back value 70 is greater than threshold value 74, function 76 receives a digital HIGH and outputs a signal 82 indicative of the fold-back as determined by function 76. When the fold-back value 70 is less than the predetermined fold-back value 74, function 80 receives a digital HIGH and outputs a signal 84 indicative of the predetermined value of the fold-back as set by function 80.

The output of timer 42 is fed into decrease charge accumulation function 86. The output 46 of charge accumulation determining function 28 is also fed into charge accumulation reduction function 86. When decrease charge accumulation function 86 receives a digital HIGH from timer 42, function 86 decreases the determined charge accumulation 46. For example, function 86 may reduce the determined charge accumulation 46 by a fixed value of 10.

When the sensed current 38 is less than the threshold current 40 for more than the predetermined period of time, timer 42 times out and function 86 receives a digital HIGH from timer 42. When function 86 receives a digital HIGH, it outputs a signal 88 indicative of the decreased charge accumulation. The signal 88 is fed back into the charge accumulation determining function 28 so that the function 28 can determine the present charge accumulation accounting for the value of the previously reduced charge accumulation 88. When the $N^{th}$ determined charge accumulation is fed back into function 28, it is fed back as the $N^{th}-1$ determined charge accumulation so that, in accordance with the formula discussed above, it can be used in the determination of the next $N^{th}$ charge accumulation, i.e. summed with the difference between the threshold current value and the next $N^{th}$ current sample.

The output 88 of charge reduction function 86 is also fed into one input of comparator 90, the other input of comparator 90 is connected to a threshold charge accumulation value 92. In the example illustrated, the threshold charge accumulation 92 is zero as it is connected to ground. Comparator 90 outputs a digital HIGH when the threshold value 92 is greater than the reduced charge accumulation 88. Otherwise, comparator 90 outputs a digital LOW. Accordingly, in the example illustrated, comparator 90 does not output a digital HIGH until the reduced charge accumulation 88 is less than or equal to zero.

The output of comparator 90 is fed into an increase fold-back function 94. When the increase fold-back function receives a digital HIGH from comparator 90, the function 94 increases the value of the fold-back. For instance, the function 94 may increase the fold-back by a fixed value of 0.001. When the charge accumulation is less than the threshold value 92, function 94 outputs a signal 96 indicative of the increased fold-back. Note that when the process begins, the fold-back is originally set to a predetermined value, such as one.

The output 96 of function 94 is fed into one input of comparator 98. Another fold-back threshold 100 is fed into the other input of comparator 98. In the example illustrated, the threshold value 100 of the fold-back is one. Comparator 98 outputs a digital HIGH when the value of the fold-back, indicated by signal 96, is greater than the threshold value 100. Otherwise, comparator 98 outputs a digital LOW.

The output of comparator 98 is fed into set fold-back function 102. When the said fold-back function 102 receives a digital HIGH from comparator 98, function 102 sets the fold-back to the predetermined value 100. When fold-back function 102 receives a digital HIGH, it outputs a signal 104 indicative of the predetermined value of the fold-back 100.

The output of comparator 98 is also fed into inverter 106. The inverter 106 inverts the input it receives. Accordingly, inverter 106 outputs a digital HIGH when it receives a digital LOW from comparator 98. Similarly, inverter 106 outputs a digital LOW when it receives a digital HIGH from comparator 98.

The output of inverter 106 is fed into set fold-back function 108. When function 108 receives a digital HIGH from inverter 106, function 108 sets the fold-back to the value 96 as determined in increase fold-back function 94. Accordingly, when the increased fold-back value 96 is less than the predetermined threshold value 100, function 108 receives a digital HIGH from inverter 106 and outputs a signal 110 indicative of the value of the increased fold-back 96 as determined in function 94.

The output of comparator 98 is fed back into the reset input R of timer 42 so that timer 42 is reset when the increased fold-back value 96 is greater than the threshold value 100. Because, in the example illustrated, a maximum current is allowed to be provided to the motor 22 when the fold-back is equal to one, the timer 42 is reset once the fold-back is set to one. Resetting the timer 42 causes it to once again time out and thereby confirm that the sensed current 38 provided to the motor 22 is below the threshold current value 40 for the predetermined period of time before the fold-back, and hence the amount of current provided to the motor 22, is increased.

The output of comparator 90 is also output to set charge accumulation function 112. When function 112 receives a digital HIGH from comparator 90, function 112 sets the charge accumulation to the predetermined threshold charge accumulation 92. Accordingly, when the decreased charge accumulation 88 is less than the threshold 92, function 112 outputs a signal 114 indicative of the threshold charge accumulation, zero in the example illustrated, as determined by function 112. The output 114 is fed back to the charge accumulation determining function 28 so that the function 28 can determine the present charge accumulation accounting for the value 114 of the charge accumulation as determined in function 112. When the charge accumulation 114 is fed back into function 28, it is fed back as the $N^{th}$-1 determined charge accumulation so that, in accordance with the formula discussed above, it can be used in the determination of the next $N^{th}$ charge accumulation, i.e. summed with the difference between the threshold current value and the next $N^{th}$ current sample.

Signals 68, 82, 84, 104 and 110, indicative of respective values of the fold-back, are fed into a current controller 30. The value of the fold-back as indicated by signal 68, 82, 84, 104 or 110 is applied to, or rather multiplied by, the current supplied to the motor 22 to adjust the amount of current provided to the motor. Accordingly, the current provided to the motor 22 is either increased, decreased or left the same, depending on the value of the fold-back. For instance, in the example illustrated, the current is left the same when the value of the fold-back is one. In this situation, the maximum current is provided to the motor 22. When the fold-back is subsequently decreased to less than one, the current provided to the motor 22 is decreased. As the fold-back is increased toward a value of one, the current provided to the motor 22 is increased. It is to be appreciated that the fold-back can be any value. Note that at any point in time, only one of the signals 68, 82, 84, 104 and 110 are indicative of a fold-back value. This is because only one of the respective functions 68, 72, 80, 102, and 108 that output signals 68, 82, 84, 104 and 110 will receive a digital HIGH at a time.

Each of the signals 68, 82, 84, 104 and 110 are fed back through the decrease fold-back function 54 and increased fold-back function 94. This allows the respective functions 54 and 94 to decrease and increase the present value of the fold-back. Again, because only one of the signals 68, 82, 84, 104, and 110 indicate a fold-back value at a time, the respective functions 54 and 94 only have one fold-back value to decrease or increase at any particular time.

Figure 3:
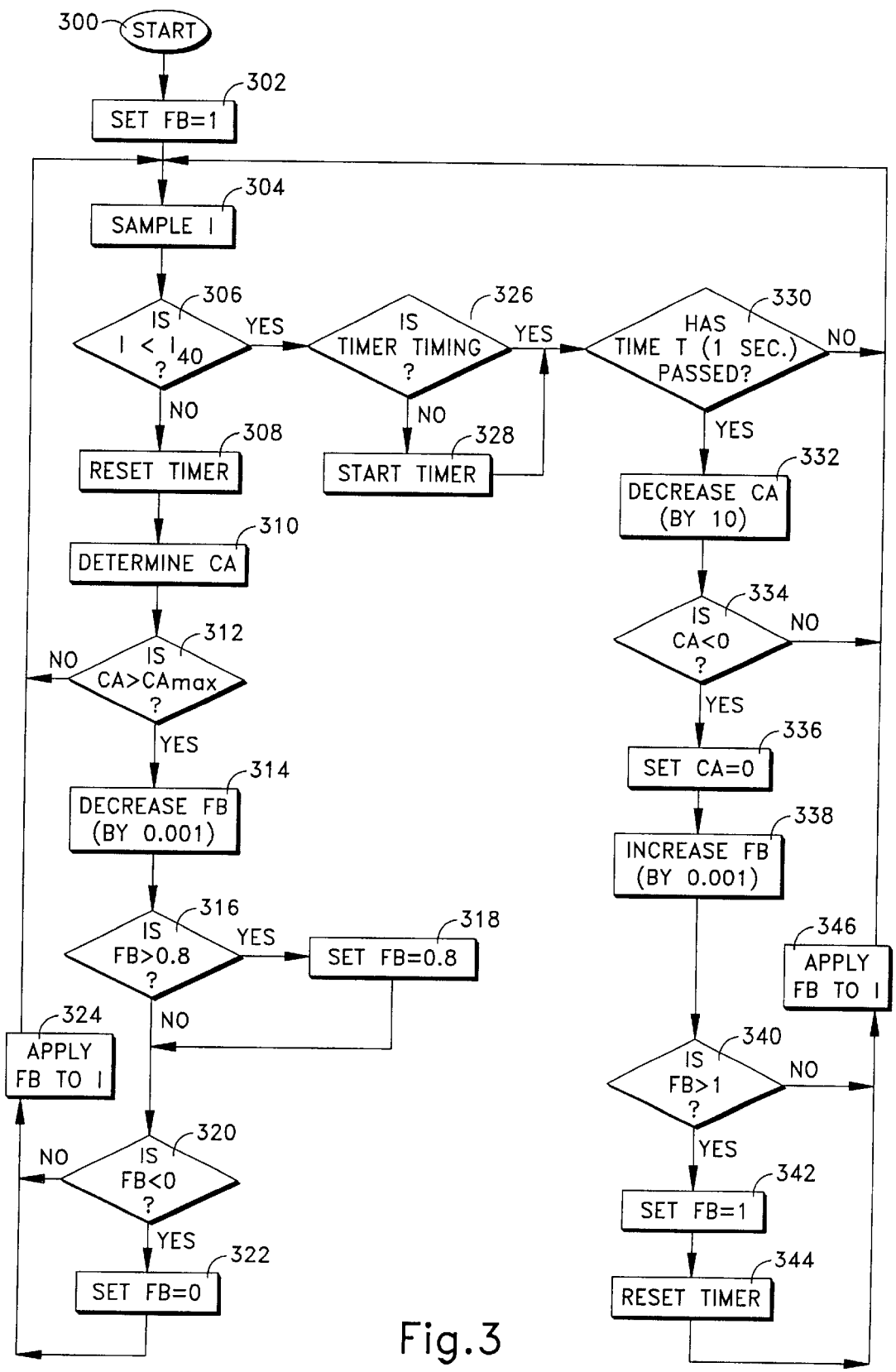
FIG. 3 is a flow diagram showing a control process in accordance with the present invention.

With reference now to FIG. 3, a flow diagram illustrating a control process in accordance with the present invention is shown. The process starts at step 300 wherein flags are set, memories are cleared, etc. The process then proceeds to step 302 wherein the initial value of the fold-back is set. In the example illustrated, the fold-back is initially set to one, the process then proceeds to step 304 wherein an instantaneous measurement of the current 38 provided to the motor 22 is taken by the current sensor 24. The process then proceeds to step 306 wherein a determination is made whether the sensed current 38 is less than the threshold current value 40. In the example discussed above, this threshold current value 40 is 80 amps.

If the determination in step 306 indicates that the threshold current value 40 is not greater than the sensed current 38, the process proceeds to step 308 wherein the timer 42 is reset to zero. The timer 42 is reset even if it has not yet been started.

The process then proceeds to step 310 wherein the charge accumulation 46 is determined. The charge accumulation is determined in accordance with the formula discussed above based upon the sensed current 38, the threshold current 40 and previously determined charge accumulation values 46, 88, or 114. The process then proceeds to step 312 wherein a determination is made whether the determined charge accumulation 46 is greater than the threshold charge accumulation 50. If the determination in step 312 is negative, the process returns to step 304 wherein an instantaneous measurement of the current 38 provided to the motor 22 is once again taken.

If, however, the determination in step 312 is affirmative, the process proceeds to step 314 and the fold-back is decreased by a predetermined value. In the example illustrated, the fold-back is decreased by 0.001 in the decrease fold-back function 54.

The process then proceeds to step 316 wherein a determination is made whether the fold-back is greater than the predetermined value 60. In the example illustrated, the value 60 is 0.8.

If the determination in step 316 is affirmative, indicating that the fold-back 56 is greater than the value 60, the fold-back is set to the value 60 in step 318. Alternatively, if the determination in step 316 is negative indicating that the fold-back is not greater than the predetermined value 60, the process proceeds to step 320 wherein a determination is made whether the fold-back is less than another threshold value 74, zero in the example illustrated. Note that after step 318, the process also proceeds to step 320.

If the determination in step 320 is affirmative indicating that the fold-back is less than the threshold value 74, the process proceeds to step 322 wherein the fold-back is set to the predetermined value 74. The process then proceeds to step 324 wherein the fold-back is applied to the current provided to the motor 22.

If the determination in step 320 is negative indicating that the fold-back is not less than the predetermined value 74, the process jumps to step 324 and the fold-back is applied to the current provided to the motor. After step 324, the process returns to step 304 and an instantaneous sample of the current 38 provided to the motor 22 is once again taken.

If the determination in step 306 is affirmative indicating that the threshold current value 40 is greater than the sensed current 38 provided to the motor 22, the process proceeds to step 326 wherein a determination is made whether the timer 42 is timing. If the determination in step 326 is negative, the process proceeds to step 328 wherein the timer is started. Regardless of whether the timer has just been started or has already been timing, the process proceeds to step 330 wherein a determination is made whether a predetermined period of time, one second in the example illustrated, has passed. If the determination in step 330 is negative, the process returns to step 304 wherein an instantaneous measurement of the current 38 provided to the motor 22 is once again taken.

If the determination in step 330 is affirmative, indicating that the current provided to the motor 22 has been less than the threshold current 40 for more than one second, the process proceeds to step 332 wherein the determined charge accumulation is decreased. In the example illustrated, the charge accumulation is decreased by a factor of 10.

After step 332, the process proceeds to step 334 wherein a determination is made whether the decreased charge accumulation is less than a threshold value 92. The threshold value 92 is zero in the example illustrated. If the determination in step 334 is negative, indicating that the charge accumulation has not been reduced below the threshold value 92, the process returns to step 304 and an instantaneous measurement of the current 38 provided to the motor is once again taken.

If, however, the determination in step 34 is affirmative, indicating that the charge accumulation is less than the threshold value 92, the process proceeds to step 336 wherein the charge accumulation is set to the predetermined value 92, zero in the example illustrated.

Once the current is less than the threshold current for at least one second and the charge accumulation has been reduced to the threshold value 92, the process proceeds to step 338 wherein the fold-back is increased by a predetermined amount. In the example, illustrated, the fold-back is increased by 0.001. The process then proceeds to step 340 wherein a determination is made whether the fold-back is greater than the threshold 100. In the example illustrated, the threshold 100 is one. If the determination in step 340 determines that the fold-back is greater than one, the process proceeds to step 342 wherein the fold-back is set to the predetermined value 100, one in the example illustrated. The process then proceeds to step 344 wherein the timer 42 is reset.

The process then proceeds to step 346 wherein the fold-back is applied to the current to be provided to the motor 22. If the determination in step 340 is negative, indicating that the fold-back is not greater than the threshold value 100, the process jumps to step 346 and the fold-back is applied to the current provided to the motor 22. After step 346, the process returns to step 304 and an instantaneous measurement of the current 38 provided to the motor 22 is once again taken.

Figure 4:
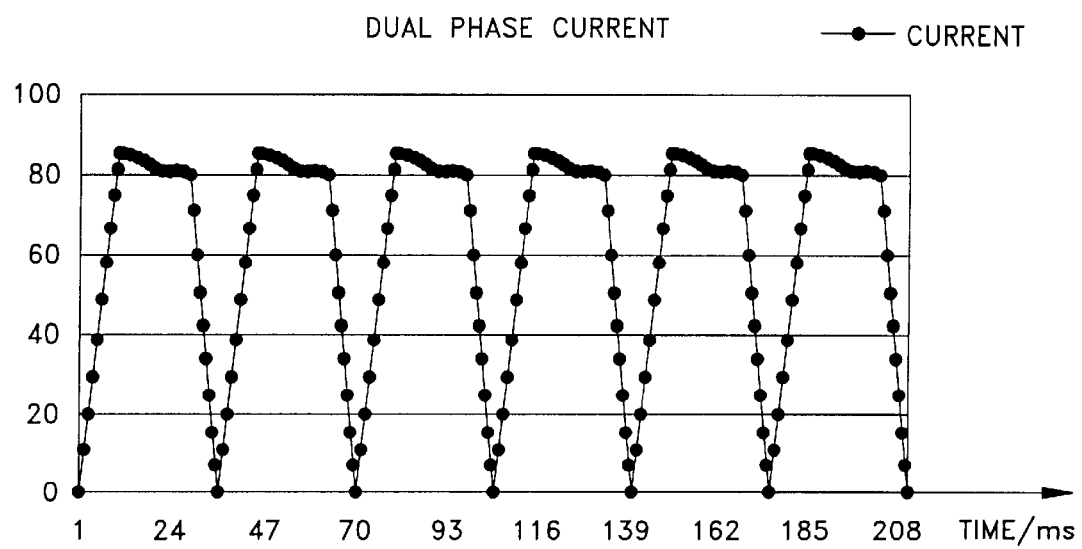
FIG. 4 is a graph showing an exemplary plot of instantaneous current measurements over time.

FIG. 4 shows an exemplary plot of many instantaneous measurements of the current provided to the motor. The graph illustrates the measurements plotted against the period of time over which they were taken. The time over which the measurements were taken is shown with respect to the X-axis while the measurements themselves are plotted with respect to the Y-axis. Accordingly, the exemplary threshold current value 40 of 80 amps is illustrated with respect to the Y-axis in the Figure.

In accordance with the present invention, only those samples above the threshold 40 are used to calculate the charge accumulation. This is illustrated with reference to the left leg of the flowchart of FIG. 3. The charge accumulation is only determined in the left leg of the flowchart. The left leg of the flowchart is only entered when the current 38 is greater than the threshold current value 40. When the current is below the threshold value 40, the flowchart enters the right leg of the flowchart. In the right leg, the present value of the charge accumulation is not determined. Accordingly, the charge accumulation is only determined when the current exceeds the threshold value 40. Because of this, those current samples illustrated in FIG. 4 that have a value below the threshold value 40, are not subtracted out from the charge accumulation.

The charge accumulation is calculated in this fashion so that it anticipates temperature rises in the drive circuit 32. The heat generated within the drive circuit is a function of the current provided to the motor 22. Determining the charge accumulation from only those excursions above the threshold current anticipates excessive heat that may be developed within the drive circuit.

Reducing the charge accumulation by those current samples that are below the threshold value 40 may prohibit the charge accumulation from ever reaching the charge accumulation threshold value 50. If the threshold value 50 is never reached, the fold-back, and hence the current provided to the motor 22, is never decreased. The temperature of the circuit 32 is also, therefore, never decreased by the present invention. Accordingly, determining the charge accumulation in this fashion allows the present invention to control the current provided to the motor 22 so that the operation of the drive circuit 32 is maintained within acceptable tolerances.

The charge accumulation, therefore, increases over time. According to the previously mentioned formula for determining the charge accumulation, the threshold current value 40 is subtracted from each sample in excess of the threshold value 40. This gives an instantaneous charge for each sample. These differences are then added together to determine the charge accumulation over time. As shown in FIG. 3, the charge accumulation does not get decreased until the current 38 provided to the motor 22 is less than the threshold value for more than one second. Reducing the charge accumulation eventually permits the fold-back to be increased, thereby increasing the current provided to the motor. A time delay, such as the one second delay shown in the example illustrated, allows any heat built up in the drive circuit 32 to adequately dissipate before the current provided to the motor is increased.

Figure 5:
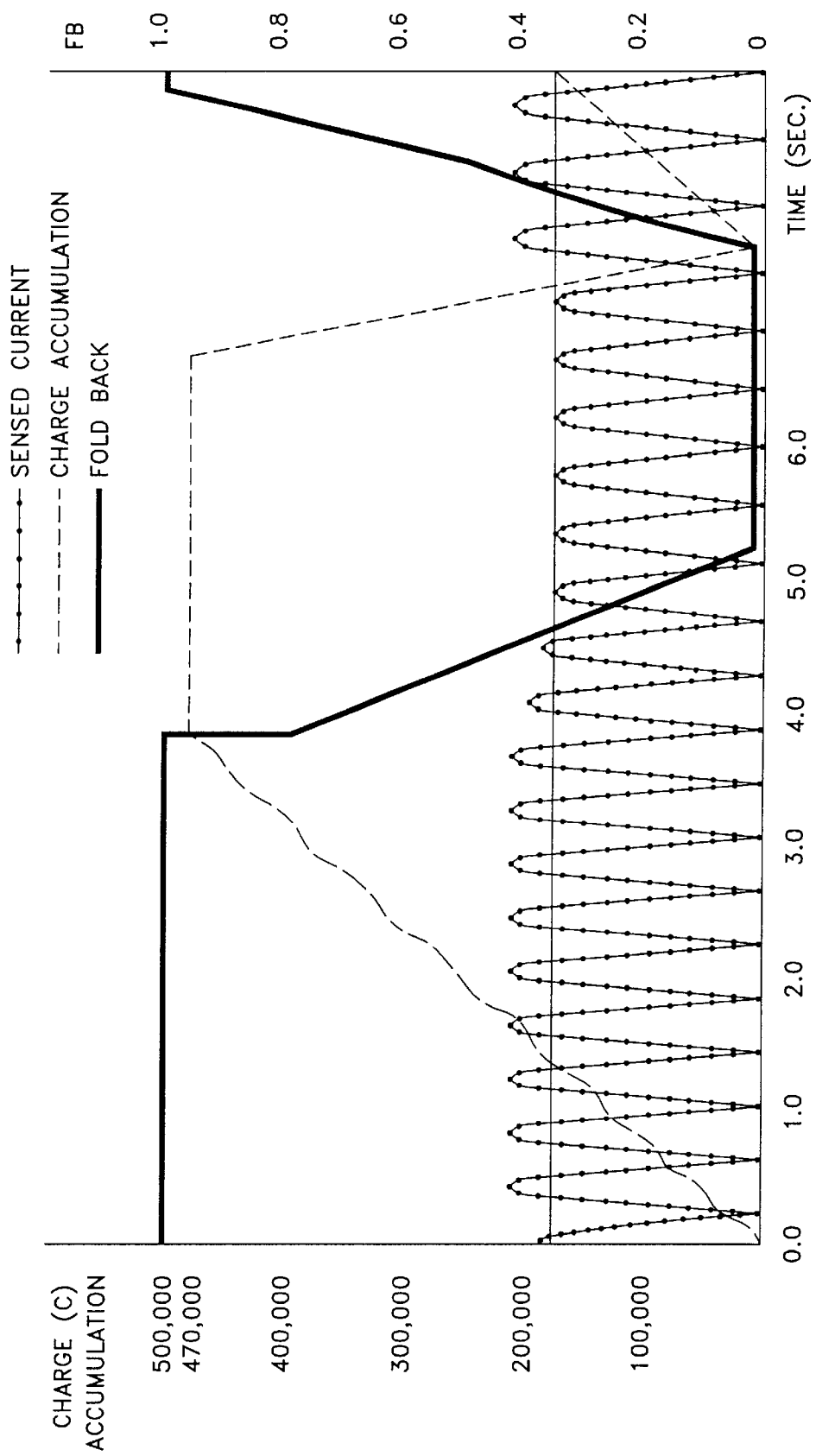
FIG. 5 is a graph showing an exemplary plot of instantaneous current measurements over time versus a fold-back factor and determined charge accumulation over time.

With reference now to FIG. 5, the instantaneous current measurements are shown over time with respect to the determined charge accumulation and fold-back. In the graph, the charge accumulation is listed on the left-hand side Y-axis, while the value of the fold-back is listed on the right-hand side Y-axis. Time is shown on the X-axis. Some of the current samples are in excess of the threshold value 40. In particular, the maximum samples are approximately 85 amps. As shown in the graph, the charge accumulation increases as long as some of the current samples exceed the threshold current value 40. This is because the differences between these excess samples and the threshold current value 40 are added together to determine the charge accumulation. When the charge accumulation reaches the threshold charge accumulation 50, the fold-back is immediately dropped to a predetermined value. In the example illustrated, the fold-back is dropped to 0.8 when the determined charge accumulation reaches the exemplary charge accumulation threshold of 470,000 Coulomb-samples per second. Note that, as explained above, when the current provided to the motor 22 is 85 amps, the threshold charge accumulation is reached in four seconds.

Accordingly, once the fold-back is dropped to 0.8, a smaller amount of current is provided to the motor 22. The fold-back continues to be reduced as long as the charge accumulation is greater than the threshold charge accumulation 50. The reduced fold-back eventually causes each and every one of the current samples to be below the threshold 40. Notice that once the motor current samples no longer exceed the threshold current value 40, the charge accumulation levels off. This is because only the difference between the threshold charge accumulation 40 and those current samples that are in excess of the threshold charge accumulation 40 are added together to determine the charge accumulation. When the motor current samples no longer exceed the threshold current value 40, there is nothing more to add to the charge accumulation.

Once no current samples above the threshold value 40 are detected for a predetermined period of time, i.e. one second, the charge accumulation begins to be decreased, such as by some fixed value. This can also be seen in the right leg of the flowchart in FIG. 3 wherein the charge accumulation is reduced by a factor of 10. Once the charge accumulation is decreased to a predetermined threshold value 92, zero in the example illustrated, while no current samples above the threshold current value 40 are detected, the fold-back begins to be increased. The rate at which a charge accumulation is decreased may be varied to effect the desired time lapse to permit adequate cool down of the circuit 32 and corresponding components.

Increasing the fold-back allows more current to be provided to the motor 22. In the example illustrated, the fold-back 22 is eventually increased back to a value of one. In the example illustrated, this allows the maximum current to be provided to the motor 22.

From the above description of the invention, those skilled in the art will perceive improvements, changes and modifications. Such improvements, changes and modifications are intended to be included within the scope of the appended claims.

Having described the invention, the following is claimed:

1. A method for protecting a drive circuit for an electric power assist steering motor, said method comprising the steps of:
   determining a charge accumulation from current provided to the motor, and
   controlling the current provided to the motor based upon the determined charge accumulation,
   wherein the step of determining a charge accumulation includes the steps of:
   measuring an instantaneous value from the current provided to the motor;
   subtracting a threshold value from the instantaneous value; and
   adding the difference to a previously determined charge accumulation.

2. The method of claim 1 further including the step of decreasing the current provided to the motor when the determined charge accumulation is greater than a threshold charge accumulation.

3. The method of claim 2 wherein the step of decreasing the current provided to the motor includes the step of applying a fold-back factor to the current provided to the motor.

4. The method of claim 3 further including the step of decreasing the fold-back factor when the determined charge accumulation is greater than the threshold charge accumulation.

5. The method of claim 1 further including the steps of:
   determining whether the current provided to the motor is less than a threshold current value for a predetermined period of time; and
   controlling the current provided to the motor based upon the determination of whether the current provided to the motor is less than the threshold current value for the predetermined period of time.

6. The method of claim 5 further including the step of increasing the current provided to the motor when the current provided to the motor is less than the threshold current value for the predetermined period of time.

7. The method of claim 6 further including the step of increasing the current provided to the motor when the determined charge accumulation is less than or equal to a second threshold charge accumulation.

8. The method of claim 7 further including the step of applying a fold-back factor to the current provided to the motor to increase the current provided to the motor.

9. The method of claim 8 further including the step of increasing the fold-back factor when the determined charge accumulation is less than or equal to the second threshold charge accumulation and the current provided to the motor is greater than the threshold current value for the predetermined period of time.

10. A method for protecting a drive circuit for an electric power assist steering motor, said method comprising the steps of:
    determining a charge accumulation from current provided to the motor, and
    controlling the current provided to the motor based upon the determined charge accumulation,
    wherein the charge accumulation is determined according to the formula:

$$CA_n = CA_{n-1} + I_n - I_{max}$$

wherein $CA_n$ is the charge accumulation;
    $CA_{n-1}$ is a previous charge accumulation;
    $I_n$ is an instantaneous value measured from the current provided to the motor; and
    $I_{max}$ is a threshold current value.

11. An over-current protection device for protecting a drive circuit of an electric power assist steering motor comprising:
    means for determining a charge accumulation from current provided to the motor,
    means for controlling the current provided to the motor based upon said determined charge accumulation,
    means for measuring an instantaneous value from the current provided to the motor;
    wherein said means for determining a charge accumulation from current provided to the motor includes:
    means for subtracting a threshold value from said instantaneous value; and
    means for adding the difference to a previously determined charge accumulation; and
    means for decreasing the current provided to the motor when said determined charge accumulation is greater than a threshold charge accumulation.

12. The device of claim 11 wherein said means for controlling comprises said means for determining, said means for adding, said means for subtracting, and said means for decreasing.

13. The device of claim 12 wherein said means for decreasing decreases the current provided to the motor by applying a fold-back factor to the current provided to the motor.

14. The device of claim 13 wherein said means for controlling also decreases said fold-back factor when said determined charge accumulation is greater than said threshold charge accumulation.

15. The device of claim 11 further including means for determining whether the current provided to the motor is less than a threshold current value for a predetermined period of time and means for determining whether said determined charge accumulation is less than or equal to a second threshold charge accumulation, said means for controlling also controlling the current provided to the motor based upon said determination of whether the current provided to the motor is less than said threshold current value for said predetermined period of time and whether said determined charge accumulation is less than or equal to said second threshold charge accumulation.

16. The device of claim 15 wherein said means for controlling increases the current provided to the motor by applying a fold-back factor to the current provided to the motor when the current provided to the motor is less than said threshold current value for said predetermined period of time and when said determined charge accumulation is less than or equal to said second threshold charge accumulation.

17. An over-current protection device for protecting a drive circuit of an electric power assist steering motor comprising:
    means for determining a charge accumulation from current provided to the motor, and
    means for controlling the current provided to the motor based upon said determined charge accumulation,
    wherein said determining means determines said charge accumulation according to the formula:

$$CA_n = CA_{n-1} + I_n - I_{max}$$

wherein;

$CA_n$ is the charge accumulation;

$CA_{n-1}$ is a previous charge accumulation;

$I_n$ is an instantaneous value measured from the current provided to the motor; and $I_{max}$ is a threshold current value.

18. An over-current protection device for protecting a drive circuit of an electric power assist steering motor comprising:

a current sensor for sensing current provided to the motor; and a controller for:

determining whether said sensed current is less than a threshold current value;

determining a charge accumulation by subtracting said sensed current from a threshold current value and adding the difference to a previously determined charge accumulation;

decreasing a fold-back factor when said sensed current is greater than said threshold current value and said determined charge accumulation is greater than a threshold charge accumulation;

decreasing the current provided to the motor by applying said fold-back factor to the current provided to the motor;

determining whether said sensed current is less than said threshold current value for a predetermined period of time;

determining whether said determined charge accumulation is less than or equal to a second threshold charge accumulation;

increasing said fold-back factor when said sensed current is less than said threshold current value for said predetermined period of time and said determined charge accumulation is less than or equal to said second threshold charge accumulation; and increasing the current provided to the motor by applying said fold-back factor to the current provided to the motor.

* * * * *